United States Patent [19]

Cho et al.

[11] Patent Number: 5,695,545
[45] Date of Patent: Dec. 9, 1997

[54] DEGASSING LIQUIDS: APPARATUS AND METHOD

[75] Inventors: Kwantai Cho; Xiaoyan Huang, both of Charlotte, N.C.

[73] Assignee: Hoechst Celanese Corporation, Somerville, N.J.

[21] Appl. No.: 644,770

[22] Filed: May 10, 1996

[51] Int. Cl.$^6$ .............................. B01D 19/00; B01D 53/22
[52] U.S. Cl. .............................. 95/46; 96/6; 96/8
[58] Field of Search .............................. 95/46; 96/6, 8, 96/10

[56] References Cited

U.S. PATENT DOCUMENTS

| | | | |
|---|---|---|---|
| 4,268,279 | 5/1981 | Shindo et al. | 95/46 |
| 4,531,954 | 7/1985 | Klein | 96/6 |
| 4,568,366 | 2/1986 | Frederick et al. | 96/6 |
| 4,659,343 | 4/1987 | Kelly | 95/46 |
| 4,869,732 | 9/1989 | Kalfoglou | 95/46 |
| 4,879,041 | 11/1989 | Kurokawa et al. | 95/46 X |
| 5,100,555 | 3/1992 | Matson | 95/46 X |
| 5,123,937 | 6/1992 | Shibata et al. | 95/46 |
| 5,194,158 | 3/1993 | Matson | 95/46 |
| 5,264,171 | 11/1993 | Prasad et al. | 264/103 |
| 5,284,584 | 2/1994 | Huang et al. | 210/321.61 |
| 5,352,361 | 10/1994 | Prasad et al. | 210/321.81 |

FOREIGN PATENT DOCUMENTS

| | | | |
|---|---|---|---|
| 52-143213 | 6/1979 | Japan . | |
| 61-037363 | 8/1986 | Japan | 96/10 |
| 1-231905 | 9/1989 | Japan | 96/8 |
| 6-121902 | 5/1994 | Japan | 95/46 |

OTHER PUBLICATIONS

LIQUI-CEL® Extra-Flow 4X28 Membrane Contactor Product Data Sheet, 1996, Hoechst Celanese Corporation, Charlotte, North Carolina.

*Primary Examiner*—Robert Spitzer

[57] ABSTRACT

The present invention is directed to a microporous membrane contactor for degassing liquids at temperatures greater than (>) 60° C. and at pressures greater than or equal ($\geq$) to 40 psig. The contactor has a microporous hollow fiber membrane adapted to withstand collapse and resist appreciable pore shrinkage or pore closure when subjected to liquid temperatures greater than (>) 60° C. and liquid pressures greater than or equal to ($\geq$) 40 psig for a period of greater than or equal to ($\geq$) 30 days. A housing encloses the membrane.

17 Claims, 1 Drawing Sheet

DEGASSING LIQUIDS: APPARATUS AND METHOD

FIELD OF THE INVENTION

The present invention is directed to degassing liquids using microporous hollow fiber membrane contactors.

BACKGROUND OF THE INVENTION

The degassing of liquid refers to the complete or controlled removal of dissolved or entrained gasses from a liquid. Liquids, used in some industrial processes, are required to be ultrapure. These ultrapure liquids are free or substantially free from: minerals, for example, iron; ions; and gas. The removal of the minerals and ions is most often accomplished through a reverse osmosis process. The reverse osmosis process, however, does not remove the dissolved or entrained gasses. The most common dissolved or entrained gas is air which has as its major components nitrogen, oxygen, and carbon dioxide.

In the past, the dissolved or entrained gasses have been removed by the use of membrane contactors, for example, hollow fiber membrane contactors. These contactors used polypropylene microporous hollow fiber membranes with wall thicknesses of less than or equal to about thirty microns. These contactors, however, could only degas a liquid from about 1° C. to about 60° C. For example see: Hoechst Celanese Corporation's LIQUI-CEL® Extra-Flow 4"×28" membrane contactor. While removal of gases at this temperature is adequate, increased demand for ultrapure liquid, in some industries, has required that more aggressive degassing techniques be investigated. Using conventional contactors, degassing liquids was limited to these temperatures because of the inability of the conventional contactors to withstand greater temperatures. At temperatures of about 60°–85° C., where more agressive degassing may occur, the hollow fibers would collapse, rendering the contactor ineffective. Accordingly, there is a need for a contactor that will operate at higher temperatures.

In the semiconductor industry, ultrapure water is needed because the ultrapure water is used to clean the surfaces of the silicon wafers used to make the semiconductor chip. Any contaminate, even the dissolved or entrained gasses, typically air, can have a detrimental effect on the chip. Accordingly, there is a need to have a source of ultrapure water.

Japanese Patent Application No. 52-143213 filed Nov. 28, 1977 discloses a polyolefin (e.g., polyethylene and polypropylene) hollow fiber with wall thicknesses of 30 and 27 microns, respectively. The hollow fibers may be used as, among other things, a gas separation membrane (which is a process for separating one gas from another gas). The polyolefin is crystalline and is nucleated, one nucleating agent is sodium benzoate. The hollow fiber is described as having "shape stability" which is understood to mean relatively small shrinkage.

SUMMARY OF THE INVENTION

The present invention is directed to a microporous membrane contactor for degassing liquids at temperatures greater than (>) 60° C. and at pressures greater than or equal to ($\geq$) 40 psig. The contactor has a microporous hollow fiber membrane adapted to withstand collapse and resist appreciable pore shrinkage or pore closure when subjected to liquid temperatures greater than (>) 60° C. and liquid pressures greater than or equal to ($\geq$) 40 psig for a period of greater than or equal to ($\geq$) 30 days. A housing encloses the membrane.

DESCRIPTION OF THE DRAWINGS

For the purpose of illustrating the invention, there is shown in the drawings a form which is presently preferred; it being understood, however, that this invention is not limited to the precise arrangement and instrumentalities shown.

DETAILED DESCRIPTION OF THE INVENTION

Figure 1:
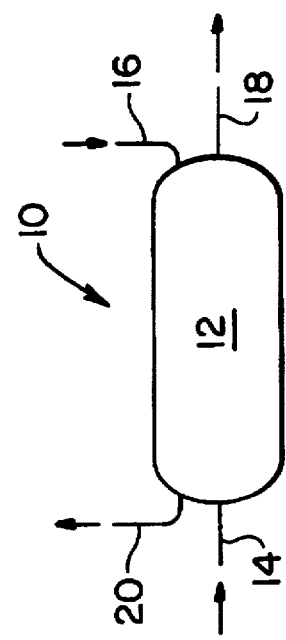
FIG. 1 is a schematic illustration of a liquid degassing process.

Referring to FIG. 1, there is shown a liquid degassing process 10. Process 10 utilizes a membrane contactor 12 (discussed in further detail below). Process 10 has a counterflow configuration, however, the invention is not so limited. Contactor 12 typically has a shell side and a tube side. Liquid 14 which contains entrained or dissolved gas is preferably introduced into the shell side of contactor 12. A sweep gas 16 (or vacuum or both sweep gas/vacuum) is preferably introduced into the tube side of the contactor 12. Degassed water 18 is discharged from contactor 12 and sweep gas 16 is also removed from the contactor 12. One of ordinary skill will readily appreciate that by varying the flow rate (or pressure), temperature, and composition of the materials on the shell and tube sides that the transport of gas across the membrane can be tailored as desired. In the instant invention, water is one liquid that can be degassed. Typically, the liquid 12, when it is water, has a minimum temperature of greater than approximately 60° C. The liquid has a maximum temperature of less than the liquid's boiling point, but preferably no greater than 80° C. (if the liquid is water). The pressure of the liquid into the contactor should be greater than about 40 psig up to approximately 120 psig, but preferably no greater than about 85 psig. The hollow fiber membrane should have good dimensional stability at or above 60° C. and 40 psig. Good dimensional stability refers to, at least, being adapted to withstand collapse and/or resist appreciable pore shrinkage or pore closure. Resist appreciable pore shrinkage or pore closure refers to any diminution or blockage of a significant number of the pores, so that the ability of the membrane to transport gas is materially reduced (i.e, by at least 50%).

Figure 2:
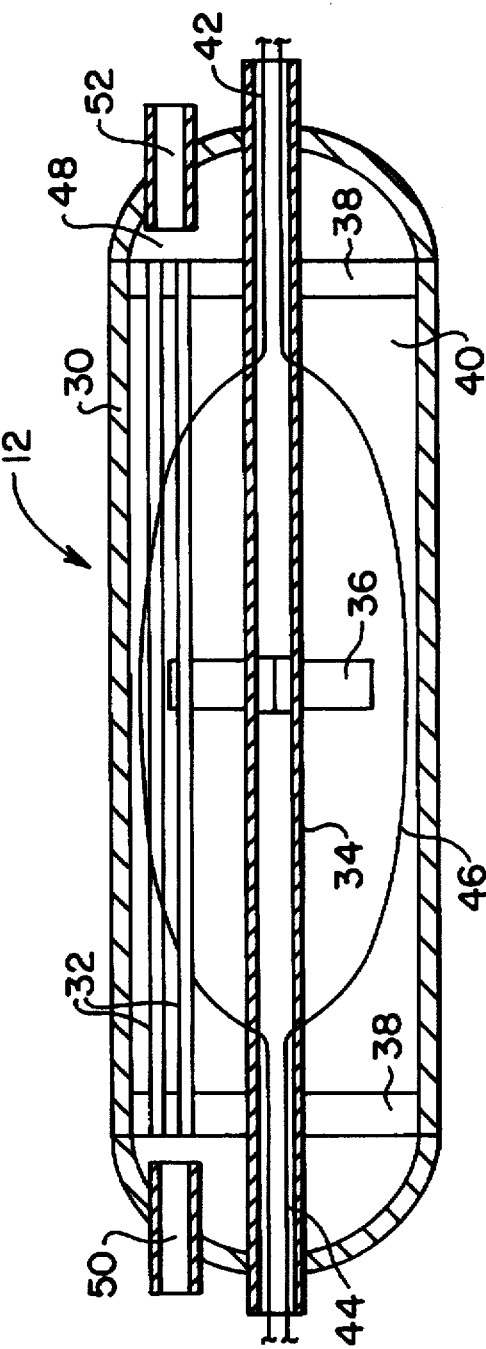
FIG. 2 is a sectional view of a contactor.

Referring to FIG. 2, an exemplary contactor 12 is shown in greater detail. Contactor 12 may be made according to U.S. Pat. Nos. 5,264,171; 5,284,584; and 5,352,171, each is incorporated herein by reference. Contactor 12 generally comprises a shell 30 and a plurality of tubes 32. Tubes 32 are preferably microporous hollow fibers. The center tube 34 is located along the longitudinal axis of shell 30. Center tube 34 is a perforated tube, so that liquid may ingress and egress therefrom. A baffle 36 may be affixed to the center tube 34 intermediate the ends thereof. Shell 30, tube sheets 38, and the exterior surfaces of the tubes 32 define shell side 40. Shell side 40 is provided with an inlet 42 and an outlet 44. The flow of material through the shell side 40 is indicated by arrows 46. The interior or lumenae of the tubes 32 define, in part, tube side 48. Tube side 48 is provided with an inlet 50 and an outlet 52. Contactor 12 is not limited to the foregoing configuration.

Microporous hollow fibers 32 preferably: are made of a polyolefin material having a wall thickness of greater than 30 micron (more preferably greater than 35 microns, and most preferably greater than or equal to ($\geq$) 50 microns); have a porosity of less than 80% (more preferably less than 60%, and most preferably about 20%); have a Gurley number of greater than 1 (more preferably greater than 100, and most preferably about 300); have a bubble point of greater than or equal to 25 psig (more preferably greater than 100 psig, and most preferably greater than 200 psig); and have a shrinkage, under no load, of less than 5% at 90° C. for 60 minutes (preferably about 2% or less).

Polyolefin refers to a class group of thermoplastic polymers derived from simple olefins. Exemplary polyolefins include, but are not limited to, polyethylene, polypropylene, polymethylpentene, copolymers of polyethylene, copolymers of polypropylene, copolymers of polymethylpentene, and combinations thereof. Preferably, the polyolefin is polypropylene which will be discussed hereinafter.

The polypropylene is preferably crystalline and has a crystallization temperature of greater than or equal to 125° C. To obtain this crystalline polypropylene, it is preferably nucleated. Nucleated or having a nucleating agent refers to the promotion of crystal nucleation which is often initiated by a material added to the polymer. Preferred nucleating agents may be selected from the group of sodium benzoate or sorbital acetate or combinations thereof. The preferred nucleating agent is sodium benzoate. Preferably, about 2400 ppm of nucleating agent is added to the polymer. The nucleated material is beneficial from at least two stand points. First, the better crystal uniformity provides greater heat stability. Second, the better crystal uniformity reduces the polymer's tendency to "creep" or close or shrink the pore size.

The polypropylene has a melt flow index (ASTM D1238-85) of greater than 0.1 gram per 10 minutes, preferably greater than 1 gram per 10 minutes and most preferably in a range of 0.1 to 20 grams per 10 minutes.

With regard to polyolefin resin selection, one should consider the additive package or stabilizer that customarily is present in all commercially available resins because some of these stabilizers can cause pore closure or pore shrinkage and/or skin formation on the fiber surface. For example, a stabilizer consisting of: 0.05% of BHT (butylated hydroxytoluene or 2,6-di-t-butyl-4-methyl phenol); 0.12% (Irganox 1010 from Ciba Geigy Corp.) tetrakis[methylene (3,5-dibutyl-r-hydroxyhydrocinnamate)]methane; and 32 ppm calcium sterate, caused complete pore blockage and a skin formed on the fiber surface. It is believed that this stabilizer leached from the polymer to block the pores and to skin the fiber surface. On the other hand, a stabilizer consisting of: 600 ppm hinder phenolic (Ethyl 330 from Ethyl Corp) and 1000 ppm phosphite (Orgafox from Ciba Ciegy Corp.), had no effect on the pores or fiber surface. Based upon the foregoing, the following stabilizer selection criteria is proposed: a stabilizer that will not migrate is preferred, such stabilizer may have high molecular weights and/or side chains consisting of long hydrocarbons (e.g., nonpolar, chemically more compatible with polyolefins); and a lower amount of stabilizer (so that there is less material to migrate).

Modules made according to the invention and subjected to temperatures above about 60° C. and pressures above 40 psig remained in operation for greater than 30 days.

The following is a preferred procedure by which a microporous hollow fiber according to the instant invention is made. The resin is polypropylene (Fina PP3362 from Fina Co). The extrusion temperature was 210° C., the extrusion speed was 100 m/min, and spinning tension was 21 grams. Rapid quenching was not necessary in view of the nucleating agent (about 2400 ppm sodium benzoate). After fiber spinning, the fiber was drawn. The spun fiber had a 332 micron OD and a 55 micron wall thickness. It was annealed at 150° C. Then, it was subjected to a 10% cold draw, a 50% hot draw (at 142° C.), and thereafter to a 20% relax (at 142° C.). The resulting fiber had the following properties: 325 micron OD; 215 micron ID; 55 micron wall thickness; 250 sec/m²—Gurley number; 250 psi—bubble point; 1.2%—shrinkage; 1.02—shape ratio; 460 g—tensile strength, and 220%—elongation at break.

All measured values set forth herein are measured according to conventional industry standards (e.g. appropriate ASTM procedures), the following values are discussed in greater detail.

Gurley—"Gurley" refers to a measure of the resistance to air flow through the wall of the microporous hollow fiber. The resistance to airflow, as measured by a Gurley densometer, is the time in seconds required to pass 10 cc of air through one square inch of product at a constant pressure of 12.2 inches of $H_2O$. The measure is reported in "sec/in²" and is normalized in the one square inch value.

Bubble point—"Bubble point" is a measure for determining the large pore diameter and the general pore diameter of the hollow fiber. About one foot of hollow fiber is tested using nitrogen pressure gas in a methanol bath. The initial pressure is 15 psig and is increased at about 5–10 psig per second. The measurement is calculated when 15 streamers of bubbles appear. The bubble point, herein, is reported in psig and correlates to pore size in microns by:

(micron)=6.86/(psig in methanol bath).

Porosity—"Porosity" is a measure of the interior pore volume and the apparent pore diameter distribution of the hollow fiber. Porosity is measured in accordance with the procedures set forth in ASTM D-2873-89.

The present invention may be embodied in other forms without departing from the spirit and essential attributes thereof and, accordingly, reference should be made to the appended claims, rather than to the foregoing specification, as indicating the scope of the invention.

We claim:

1. A method for degassing liquids at a temperature equal to 60° C. and having dissolved or entrained gas therein comprising the steps of:

providing a microporous membrane contactor having a nucleated polyolefin hollow fiber membrane having good dimensional stability above 60° C. and 40 psig; and degassing the liquid by removing the dissolved or entrained gas across the membrane.

2. A method for degassing water at a temperature equal to 60° C. and at a pressure of equal to or greater than 40 psig and having dissolved or entrained gas therein comprising the steps of:

providing a microporous membrane contactor having a plurality of polypropylene hollow fiber membrane with a wall thickness of at least 50 microns and a crystallization temperature greater than or equal to 125° C.; and degassing the water by removing the dissolved or entrained gas across the membrane.

3. A microporous membrane contactor for degassing liquids at temperatures greater than 60° C. and at pressures greater than or equal to 40 psig comprising a microporous hollow fiber membrane adapted to withstand collapse and resist appreciable pore shrinkage or pore closure when subjected to temperatures >60° C. and liquid pressures ≧40 psig for a period of ≧30 days; and a housing enclosing said membrane.

4. The contactor according to claim 1 wherein said microporous hollow fiber membrane has a wall thickness of at least 50 micron.

5. The contactor according to claim 3 wherein said microporous hollow fiber membrane comprises a polyolefin including a nucleating agent.

6. The contactor according to claim 5 wherein said nucleating agent is selected from the group consisting of sodium benzoate or sorbital acetate or combinations thereof.

7. The contactor according to claim 6 wherein said nucleating agent is sodium benzoate.

8. The contactor according to claim 3 wherein said microporous hollow fiber membrane comprise polypropylene with a crystallization temperature $\geq 125°$ C.

9. The contactor according to claim 8 wherein said polypropylene has a melt flow index of >0.1 gram/10 minutes.

10. A microporous membrane contactor for degassing liquids at temperatures greater than 60° C. and at pressures greater than or equal to 40 psig comprising:

a microporous hollow fiber membrane having a wall thickness of greater than 30 micron and made with a polyolefin containing a nucleating agent; and a housing enclosing said membrane.

11. The contactor according to claim 10 wherein said wall thickness is at least 50 microns.

12. The contactor according to claim 10 wherein said nucleating agent is selected from the group consisting of sodium benzoate, sorbital acetate or combinations thereof.

13. The contactor according to claim 12 wherein said nucleating agent is sodium benzoate.

14. A membrane comprising:

a microporous hollow fiber having a wall thickness greater than 30 microns, being made of a nucleated polyolefin, having a porosity of less than 80%, having a Gurley number greater than 1, and said polyolefin having a melt flow index of greater than 0.1 gram per 10 minutes.

15. The membrane according to claim 14 where the polyolefin is selected from the group consisting of polyethylene, polypropylene, polymethylpentene, copolymers of polyethylene, copolymers of polypropylene, copolymers of polymethylpentene, and combinations thereof.

16. The membrane according to claim 15 where the polypropylene has a crystallization temperature of $\geq 125°$ C.

17. The membrane according to claim 14 where the polyolefin is polypropylene.

* * * * *